(12) United States Patent
Lee

(10) Patent No.: US 8,287,055 B2
(45) Date of Patent: Oct. 16, 2012

(54) BRAKE CONTROL OF A VEHICLE BASED ON DRIVER BEHAVIOR

(75) Inventor: Jungwon Lee, South Lyon, MI (US)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 12/892,560

(22) Filed: Sep. 28, 2010

(65) Prior Publication Data

US 2012/0074770 A1    Mar. 29, 2012

(51) Int. Cl.
*G06F 19/00* (2011.01)
(52) U.S. Cl. .................. 303/15; 303/20; 701/48; 701/70
(58) Field of Classification Search ................. 303/3, 15, 303/20; 701/70, 72
See application file for complete search history.

(56) References Cited

U.S. PATENT DOCUMENTS

| | | | |
|---|---|---|---|
| 5,172,785 A | 12/1992 | Takahashi |
| 5,378,052 A | 1/1995 | Yoshino |
| 5,513,107 A | 4/1996 | Gormley |
| 5,555,495 A | 9/1996 | Bell et al. |
| 5,729,979 A | 3/1998 | Shaw et al. |
| 5,762,407 A | 6/1998 | Stacey et al. |
| 5,836,659 A | 11/1998 | Feigel et al. |
| 6,176,556 B1 | 1/2001 | Kizer |
| 6,198,996 B1 | 3/2001 | Berstis |
| 6,208,926 B1 | 3/2001 | Wagner et al. |
| 6,309,031 B1 | 10/2001 | Crombez et al. |
| 6,505,780 B1 | 1/2003 | Yassin et al. |
| 6,591,181 B2 | 7/2003 | Hellmann et al. |
| 6,715,846 B1 | 4/2004 | Pueschel et al. |
| 6,785,595 B2 | 8/2004 | Kominami et al. |
| 6,879,898 B2 | 4/2005 | Ghoneim et al. |
| 6,910,747 B2 | 6/2005 | Tsunehara |
| 7,072,753 B2 | 7/2006 | Eberle et al. |

(Continued)

FOREIGN PATENT DOCUMENTS

FR    2796893    2/2001

(Continued)

OTHER PUBLICATIONS

PCT/US2011/053611 International Search Report and Written Opinion dated Dec. 28, 2011 (10 pages).

(Continued)

*Primary Examiner* — Christopher Schwartz
(74) *Attorney, Agent, or Firm* — Michael Best & Friedrich LLP

(57) ABSTRACT

A system for controlling a brake force of a vehicle. In one embodiment, the system includes an electronic control unit including a controller, a plurality of sensors in electronic communication with the controller. Each of the sensors transmits sensor data to the controller. A user interface and a driver recognition system are in electronic communication with the controller, and a computer readable memory stores instructions executed by the controller. The instructions cause the controller to evaluate a driver identification data received from the driver recognition system, a driver preference data received from the user interface, and the sensor data received from the sensors. The instructions further cause the controller to classify and select a driver or a driving pattern class, execute a control algorithm to determine a driver dependent brake force based on at least one of the selected driver or driving pattern class, the driver preference data, and the driver identification data, and to regulate the brake force of the vehicle based on the driver dependent brake force.

19 Claims, 9 Drawing Sheets

U.S. PATENT DOCUMENTS

| | | |
|---|---|---|
| 7,116,803 B2 | 10/2006 | Lemelson et al. |
| 7,162,346 B2 | 1/2007 | Berry et al. |
| 7,194,114 B2 | 3/2007 | Schneiderman |
| 7,313,267 B2 | 12/2007 | Call et al. |
| 7,321,818 B2 | 1/2008 | Michi et al. |
| 7,349,917 B2 | 3/2008 | Forman et al. |
| 7,540,571 B2 | 6/2009 | Yamaguchi |
| 7,543,688 B2 | 6/2009 | Arakawa et al. |
| 7,543,691 B2 | 6/2009 | Hopkins et al. |
| 7,543,896 B2 | 6/2009 | Ariki et al. |
| 7,549,657 B2 | 6/2009 | Jargowsky et al. |
| 7,550,056 B1 | 6/2009 | Merhar |
| 7,552,663 B2 | 6/2009 | Yamanaka et al. |
| 7,552,804 B2 | 6/2009 | Baumann et al. |
| 7,552,978 B2 | 6/2009 | Yokoyama et al. |
| 7,555,401 B2 | 6/2009 | Linden et al. |
| 2002/0062185 A1 | 5/2002 | Runge et al. |
| 2003/0065432 A1* | 4/2003 | Shuman et al. ............ 701/48 |
| 2004/0160119 A1 | 8/2004 | Wagner et al. |
| 2005/0110343 A1 | 5/2005 | Gronau et al. |
| 2006/0155439 A1 | 7/2006 | Slawinski et al. |
| 2006/0163941 A1* | 7/2006 | Von Hayn et al. ......... 303/155 |
| 2007/0276574 A1 | 11/2007 | Isaji et al. |
| 2008/0157670 A1 | 7/2008 | Paik et al. |
| 2008/0189020 A1 | 8/2008 | Kudo |
| 2008/0210497 A1 | 9/2008 | Jeon |
| 2008/0236970 A1 | 10/2008 | Tuhro et al. |
| 2008/0243323 A1 | 10/2008 | Karnjate et al. |
| 2010/0198471 A1 | 8/2010 | Lich et al. |

FOREIGN PATENT DOCUMENTS

| | | |
|---|---|---|
| FR | 2890928 | 3/2007 |
| WO | WO 2008058864 * | 5/2008 |
| WO | 2009067801 | 6/2009 |
| WO | 2009068230 | 6/2009 |
| WO | 2009068404 | 6/2009 |
| WO | 2009068954 | 6/2009 |
| WO | 2009069587 | 6/2009 |
| WO | 2009069642 | 6/2009 |
| WO | 2009070198 | 6/2009 |
| WO | 2009074252 | 6/2009 |
| WO | 2009074309 | 6/2009 |
| WO | 2009074527 | 6/2009 |
| WO | 2009075002 | 6/2009 |
| WO | 2009076185 | 6/2009 |
| WO | 2009077036 | 6/2009 |
| WO | 2009077075 | 6/2009 |
| WO | 2009077090 | 6/2009 |
| WO | 2009077220 | 6/2009 |
| WO | 2009077249 | 6/2009 |
| WO | 2009077835 | 6/2009 |
| WO | 2009077855 | 6/2009 |

OTHER PUBLICATIONS

Advances for In-Vehicle and Mobile Systems: Challenges for International Standards, Chapter 2, "Driver Recognition System Using FNN and Statistical Methods", pp. 11-23, Edited by Abut et al., Spring Science and Business Media, LLC Copyright 2007.

Igarashi et al., "Biometric Identification Using Driving Behavioral Signals", May 2004 IEEE, 4 pages.

Miller et al., "Critic-Driven Ensemble Classification", IEEE Transaction on Signal Processing, vol. 47, No. 10, Oct. 1999, pp. 2833-2844.

Stepenosky et al., Majority Vote and Decision Template Based Ensemble Classifiers Trained on Event Related Potentials for Early Diagnosis of Alzheimer's Disease, 2006 IEEE, pp. 901-904.

* cited by examiner

BRAKE CONTROL OF A VEHICLE BASED ON DRIVER BEHAVIOR

FIELD

The invention relates to brake systems in vehicles. More specifically, embodiments of the invention relate to systems and methods for controlling the brake force of the vehicle based on an automatic recognition and classification system and on specific preference data input from the driver.

BACKGROUND

In a modern vehicle, it is possible for the driver to control various components of the vehicle as well as the specific vehicle operations based on the driver's preferences. For that purpose, most modern vehicles generally include an electronic control unit (ECU) or similar device (or devices) that is (or are) electronically connected to the different vehicle components and systems. For example, a memory seat includes an ECU and a driver manually inputs and controls the position of the seat using the driver dependent preference control. One or more ECU's may also be connected to the vehicle's brake system and control multiple brakes in the brake system by executing operating instructions via computer executable programs.

SUMMARY

While brake systems are controlled by one or more ECU's, most vehicles do not offer driver dependent brake systems that control the brake force of the vehicle based on the driver behavior and specific brake force preference from the driver.

Existing vehicle brake systems are not able to automatically recognize and classify the braking preferences of different drivers operating the vehicle. Further, drivers are not able to choose the specific flexible settings and functions of the vehicle braking devices. Generally, these braking functions are defined in the manufacturing process of the vehicle. For example, vehicles that are equipped with brake booster pressure control systems that automatically select the boost power at a predetermined pedal force do not allow a driver to select a specific boost power. The driver can only select some limited brake options, like soft or hard braking, or a predetermined brake force rate by using a selection switch. In addition, the user interfaces in the current vehicles only allow the drivers to input preferences related to the vehicle accessory systems. These accessory systems include the driver's seat position, audio system preferences, and auto headlight on/off system, the driver selectable preference setting from the user interface. Since there is significant difference among the braking behavior and preferences among individual drivers, there is a need for an improved system and method for controlling the brake pedal force in a vehicle that automatically recognizes the braking style of the driver, receives specific input from the driver that corresponds to his or hers preferences, and regulates the vehicle brake systems based on these characteristics. The invention provides, among other things, methods and systems for controlling the brake force of a vehicle by executing a control algorithm to determine a driver dependent braking force based on at least one of a classified driver or driving pattern class, driver preference data, and driver identification data inputted by the driver.

The invention provides a system for controlling a brake force of a vehicle. The system includes an electronic control unit including a controller, and a plurality of sensors in electronic communication with the controller. Each of the sensors transmits sensor data to the controller. A user interface and a driver recognition system is in electronic communication with the controller, and a computer readable memory stores instructions executed by the controller. The instructions cause the controller to evaluate driver identification data received from the driver recognition system, driver preference data received from the user interface, and the sensor data received from the sensors. The instructions further cause the controller to classify and select a driver or a driving pattern class, execute a control algorithm to determine a driver dependent brake force based on at least one of the selected driver or driving pattern class, the driver preference data, and the driver identification data, and to regulate the brake force of the vehicle based on the driver dependent brake force.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
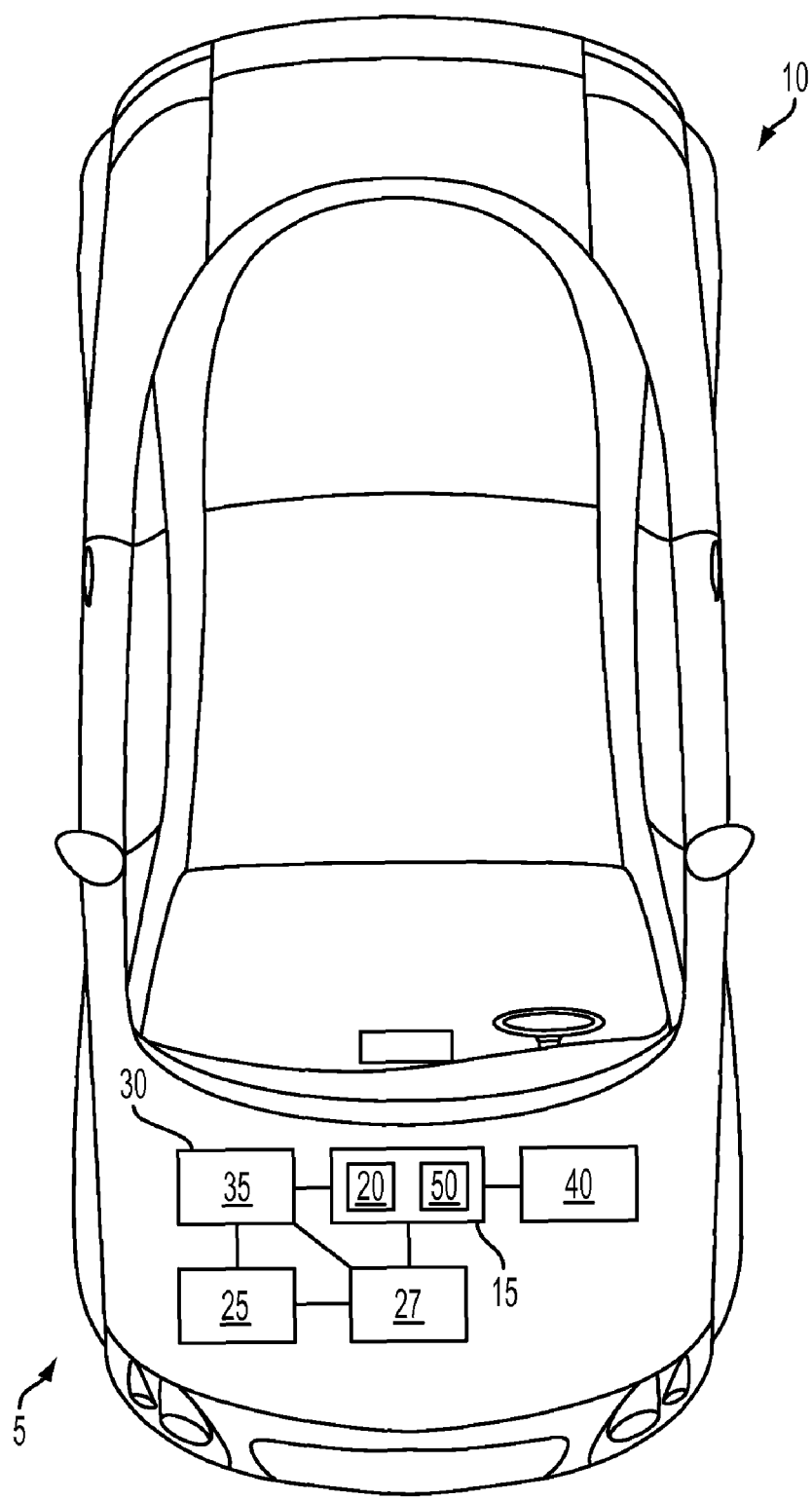
FIG. 1 illustrates a vehicle equipped with a system for controlling the brake force of a vehicle in accordance with the invention.

FIG. 1 illustrates a system 5 for controlling the brake force of a vehicle 10. The system 5 includes an Electronic Control Unit (ECU) 15 having a controller 20. The controller 20 can take the form of a programmable microprocessor with appropriate I/O devices or chips, a microcontroller, or a similar device. As described in greater detail below, the controller executes computer executable programs (i.e., software) with the aid of an operating system (not illustrated). Alternatively, the controller includes hardware, such that functions described herein are performed by hardware components. For example, the controller 20 may be implemented by an application-specific, integrated circuit (ASIC), dedicated components, or the like.

The system 5 also includes a plurality of sensors 25, a user interface 30 that is used by a driver to enter specific data, and a brake system 40 that controls the brakes of the vehicle 10. The sensors 25 are located on various components of the brake system 40 (e.g., brake pedal, active brake booster) or on the vehicle's wheels and are used to sense and report the current operating conditions of the vehicle 10 to the controller 20. These sensors 25 transmit sensor measurement data as defined data structures that includes analog data or digital data. These sensors 25 include brake pedal force sensor, brake pedal position sensor, brake pedal feel sensor, wheel speed sensor, and others. Typically, the sensors 25 are connected to a network, such as a controller area network (CAN) bus 27, which is connected to the controller 20. The CAN bus 27 is connected to other vehicle systems.

The user interface 30 includes a driver selection switch 35. As described in more details in the subsequent paragraphs, the user interface 30 is used by a driver to enter various driver preference data. This driver preference data includes specific preference information regarding the vehicle's brake force and other characteristics of the vehicle's brake system. The user interface 30 may be a component that is independent from the vehicle 10, or may be integrated in other vehicle components such as a main audio video system or climate control system. For example, a driver can use a personal data assistant (PDA) with specific application software to set his or her own brake preference data. In addition, the driver selection switch 35 is used by a driver to notify the ECU that a particular driver has entered the vehicle and will be driving the vehicle 10. The system 5 then applies a specific brake force that is associated with this driver to the brake system 40.

In various embodiments, the controller 20 of the ECU 15 receives and processes the signals received from the sensors 25. The controller 20 also receives driver preference data from the user interface 30 and driver identification data from a driver recognition system. The controller processes the received data and stores it in memory 50 inside the ECU 15. Based on the sensor data the controller determines the braking curve of the vehicle. Further, using the stored data, the controller 20 executes a control program or an algorithm to determine a driver dependent braking force and to control the operation of the brake system 40 of the vehicle 10. Thus, the brake force of the vehicle 10 is controlled based on the braking curve that is determined by the behavior of the driver and the specific driver selections and preferences.

Figure 2:
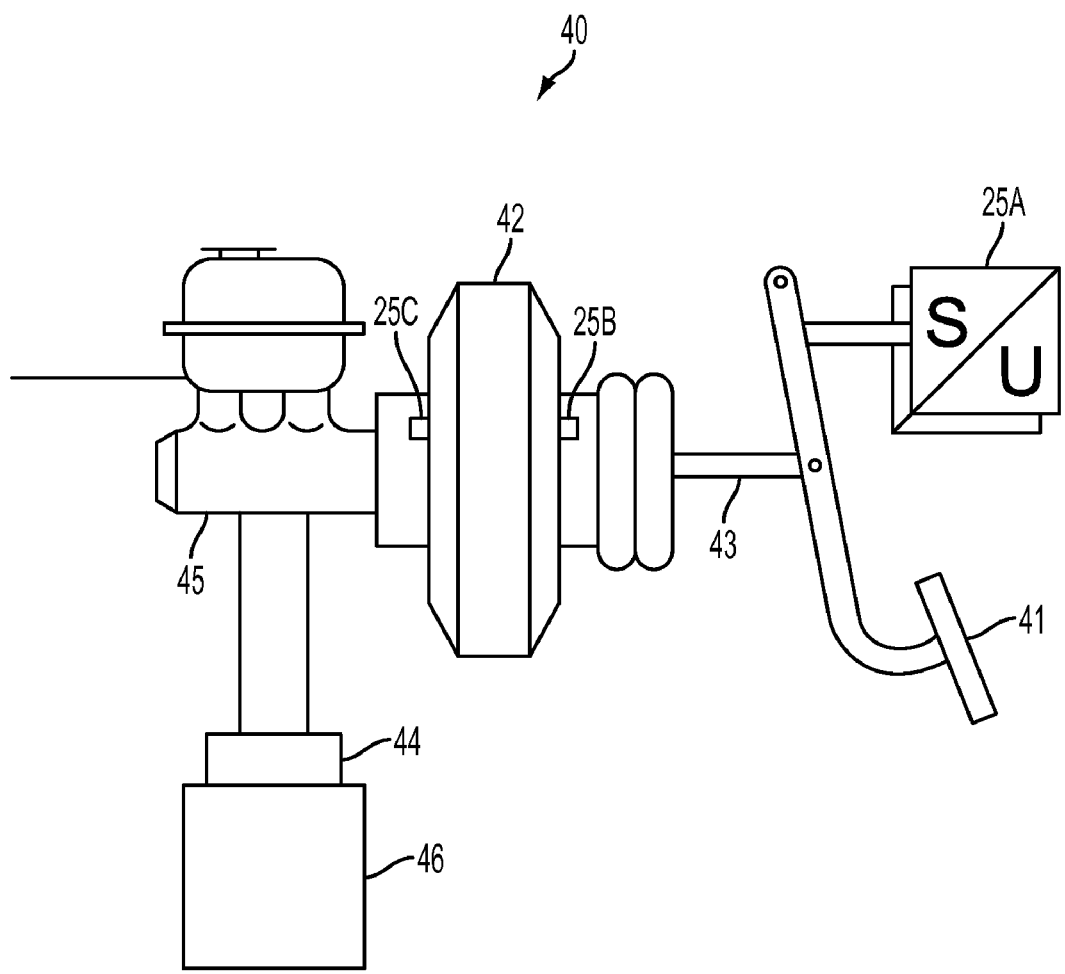
FIG. 2 illustrates a brake system for controlling the brake force of a vehicle in accordance with the invention.

The brake system 40 illustrated in FIG. 1 is used to control the brakes of the vehicle 10. The brake system 40 is operated by the ECU 15 and the ECU 15 is connected with other vehicle systems via the CAN communication bus 27. The general structure of the hydraulic brake system 40 illustrated in FIG. 2 and, among other elements, includes a brake pedal 41, an active brake booster 42, several pressure sensors 25, a pressure fluid storage unit, a pressure fluid pump, individual pressure valves, hydraulic modulator 44, and at least two friction brakes 46 controlled by the controller (not all elements of the brake system are shown). The brake system 40 further includes a master cylinder 45. The system 5 for controlling the brake force of a vehicle uses sensor 25A to measure the pressure of the brake pedal 41, sensor 25B to measure the pressure inputted into the brake booster 42, and sensor 25C to measure the pressure inputted into the master cylinder 45. The brake pedal 41 is pressed on by the driver (with his or her foot) and the force applied by the driver is (in this case) mechanically transferred (at least in part) to the brake booster 42 through a linkage 43. The active brake booster 42 amplifies the driver brake force upon imminent brake pedal contact detection and adds pressure to the master cylinder 45. Thus, the brake booster 42 generates an "assisting" or additional hydraulic pressure to the master cylinder 45. In a hydraulic brake control system, a pressure fluid pump is used as a fluid pressure source. If necessary, multiple types of brake boosters 42 can be combined together to increase the efficiency of the brake system 40 and to provide a wide range of brake-pedal operations.

Generally, the system 5 achieves driver dependent braking control with a variety of brake boosters and is not limited to the example shown. In general, the brake booster 42 provides amplification (or gain) of the applied brake pedal force to the master cylinder 45. Examples of suitable brake force boosters 42 include vacuum booster, electro-hydraulic brake booster, hydraulic brake booster, electromechanical brake booster, HPS (available from Robert Bosch GmbH. of Stuttgart, Del.), iBooster (available from Robert Bosch GmbH. of Stuttgart, Del.), Electrical Vacuum Pump (available from Hella KG Hueck & Co. Lippstadt, Del.), hydraulic brake booster with integrated electronic control unit (HB-Ci) (available from Advics Manufacturing), or TRW Active Hydraulic Boost (AHB) Braking System. Brake systems in which the invention may be implemented include electric brake systems, hydraulic brake systems, and others.

Figure 3:
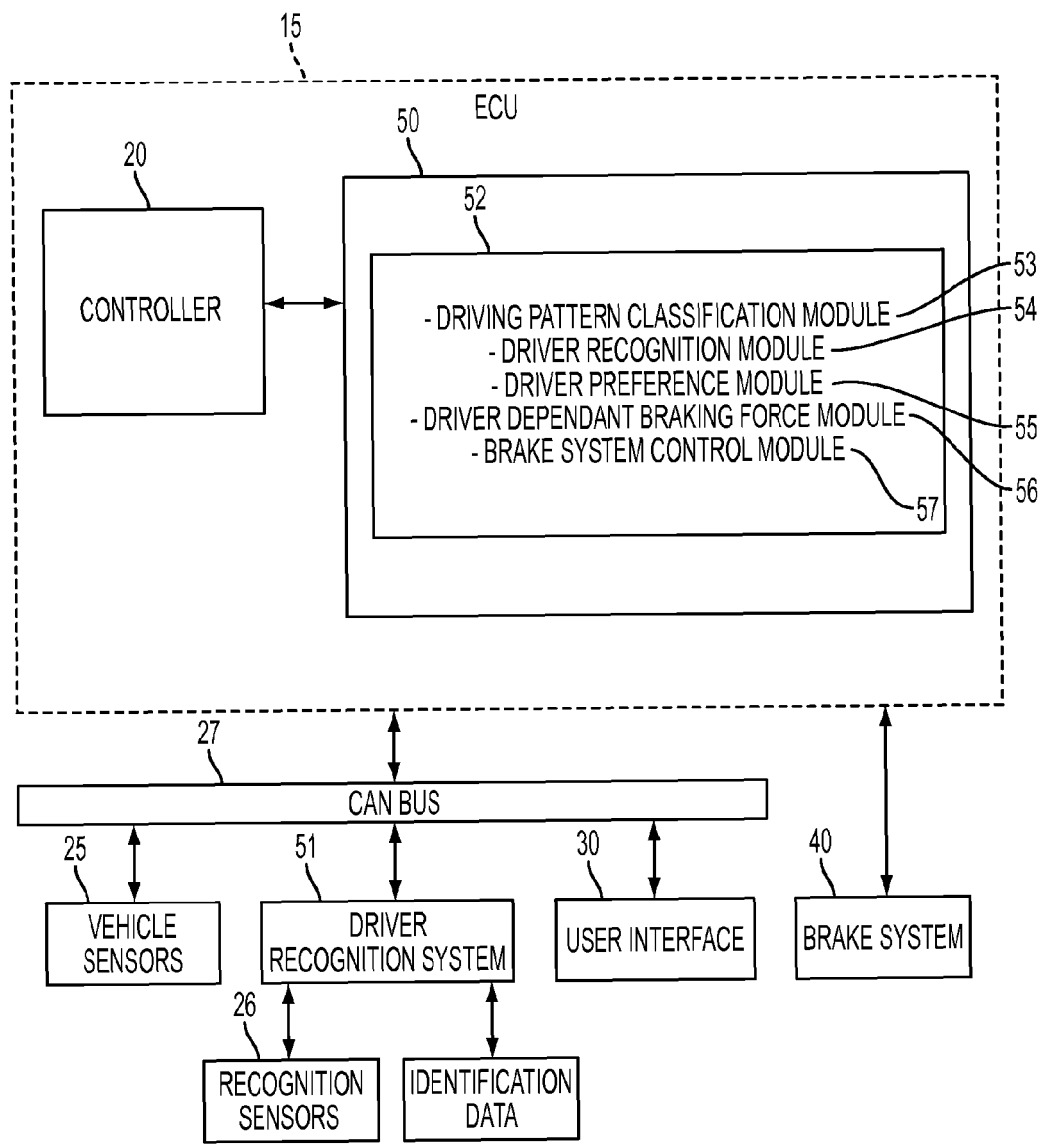
FIG. 3 is a schematic illustration of a system for controlling the brake force of a vehicle.

FIG. 3 schematically illustrates the main components of the system 5 and the connections between the ECU 15, the brake system 40, and the various sources of input data received by the ECU 15. As illustrated in FIG. 3, the ECU 15 of the control system 5 uses a CAN bus 27 to electronically communicate with a user interface 30, a driver recognition system 51, and a plurality of sensors 25. In the example illustrated in FIG. 3, the ECU 15 includes a controller 20 and one or more memory modules 50, such as a random access memory (RAM) and read-only memory (ROM) (the full structure of the ECU 15 will be described in detail below). The ECU 15 receives sensor data from the sensors 25, driver preference data from the user interface 30, and driver identification data from the driver recognition system 51. The controller 20 uses the received data to determine a driver dependent braking force and to regulate the brake system 40 via the active brake booster 42.

The controller 20 also includes a variety of system modules 52 that are stored as instructions in a memory (e.g., RAM or ROM) and are executed by a processor in the controller 20. These modules include a driving pattern classification module 53, a driver recognition module 54, a driver preference module 55, a driver dependent brake force module 56, and a brake system control module 57. The memory 50 can be internal to the controller 20, external to controller 20, or a combination thereof. The controller 20 sends information (e.g., information received from the bus 27 or information generated by the modules executed by the processor) to the memory 50. Further, the memory 50 can receive and store data from other components of the system 5.

The driver recognition system 51 receives data from multiple recognition sensors 26, which are configured to detect the identification of the driver. These driver recognitions sensors 26 are incorporated into data mining or data fusion technology systems and are used to identify the specific driver operating the vehicle. These sensors 26 are different from the sensors 25 that are used to transmit information indicating the current state of the vehicle systems. In addition, the driver recognition system 51 accepts direct input from the driver in the form of driver identification data. The driver recognition system transmits driver identification data to the ECU 15 via a wired or wireless device that can be internally incorporated into the vehicle or external to the vehicle. In one embodiment, the driver recognition system is incorporated in the user interface 30. As another example, the driver recognition system is integrated into an onboard computer and data can be inputted via a driver selection switch (not shown) of the user interface 30 (i.e., the driver recognition system is a biometric system in the vehicle). Further, wireless devices including a PDA and a key fob can be used to input driver identification data from the driver recognition system 51.

The driver identification data specifically transmits to the ECU 15 the identity of the driver operating the vehicle 10. The identity of the driver generally corresponds to brake control data stored in the memory 50 of the ECU 15 that indicates the preferences of the specific driver, including desired brake force, pedal feel, and pedal position associated with this driver. Other individual driver preferences can be also preselected and stored in the memory of the ECU 15.

The user interface 30 is used by a driver to input driver preference data that includes brake force preference data, pedal feel preference data, pedal position preference data, and other type of preference data. By the user interface 30, an individual driver directly communicates his or her specific braking preferences to the ECU 15 and "programs" the brake system 40 in accordance to these preferences. The preference data is also used to search the memory 50 for predetermined braking parameters that are used to control the brake system. The user interface 30 is structured such that driver inputs driver preference data in accordance with a predetermined format. The driver preference data may be transferred between different vehicles, particularly those vehicles that are programmed to understand the predetermined format. Drivers view their own preference data selection or modify it using the user interface 30. In addition, the driver preference data can be transferred and managed on a PDA or a personal computer using specific application software. Further, vehicle manufacturers provide user oriented application software which manages the driver preference data.

As described in greater detail below, the modules 53-57 are executed by the processor of the controller 20 and are architected to: 1) evaluate the driver identification data, the driver preference data, and the information received from the sensors, 2) classify and select a driver or a driving pattern class, 3) execute a control algorithm to determine a driver dependent brake force based on at least one of the selected driver or driving pattern class, the driver preference data, and the driver identification data, and 4) regulate the brake force of the vehicle based on the driver dependent brake force. These modules are stored to the memory of the controller 20 (e.g., RAM or ROM), for example, in the form of computer executable instructions, look-up tables, or other mechanisms for processing data received by the controller 20. Based on the data operation performed by the various modules, the system 5 determines driver dependent braking force and controls the brake system 40 of the vehicle 10.

Figure 4:
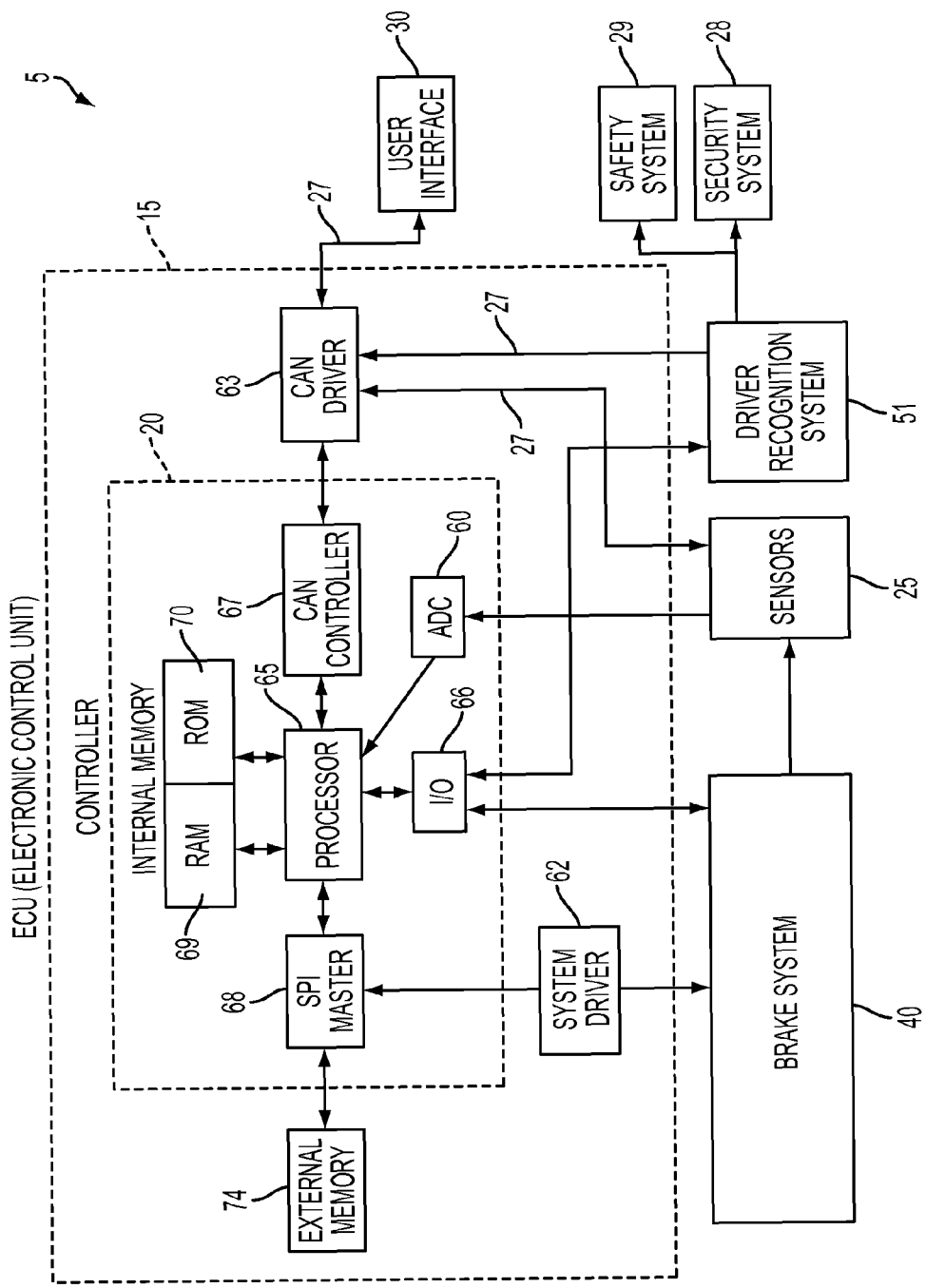
FIG. 4 is a schematic illustration of the electronic control unit of the system for controlling the brake force of a vehicle.

FIG. 4 schematically illustrates in detail the main components of the ECU 15 and the connections between the controller 20 and the rest of the vehicle systems. The controller 20 receives vehicle information in the form of sensor inputs (or sensor data) from the sensors 25. Further, the controller 20 receives driver preference data via the user interface 30 and driver identification data from the driver recognition system 51. The controller 20 processes the received data using various applications or modules in order to determine driver dependent braking force and to control the brake force based on the preferences of the driver and the braking curve of the vehicle 10 determined by the specific driver behavior.

In the example illustrated in FIG. 4, the controller 20 includes an analog digital converter (ADC) 60, an electronic processing unit (EPU) 65, an input/output interface 66, a CAN controller 67, a serial peripheral interface (SPI) master controller 68, and one or more memory modules 50, such as a random access memory (RAM) 69 and read-only memory (ROM) 70. The controller 20 electronically communicates with the sensors 25 and the various vehicle systems. The input/output interface 66 transmits and/or receives information from the brake system 40 and driver recognition system 51. The CAN controller 67 transmits and/or receives information over the CAN bus 27, including sensor readings from the sensors 25, and data from the user interface 30 and the driver recognition system 51. In some embodiments, the controller 20 obtains sensor data directly from the sensors 25 rather than over the CAN bus 27.

The CAN bus 27 is designed with separate inputs and outputs at the controller side and common inputs and outputs at the ECU external side. The CAN controller 67 stores the received data bits from the CAN bus 27 until an entire message, which is then received by the processor 65, is available. Also, the processor 65 stores outgoing messages to the CAN controller 67 that transmits the messages to the CAN bus 27, which then further transmits the outgoing messages to the various vehicle systems. The input/output interface 66 is used by the brake system 40 to communicate with the processor 65. The brake system 40 and the driver recognition system 51 accept control signals from the input/output interface 66 that is controlled by the processor 65.

The data inputted to the controller 20 can be continuous analog signal or serial digital data and can be communicated via control area network (CAN), FlexRay network, Local Interconnect Network (LIN), universal asynchronous receiver transmitter (UART), or Universal Serial Bus (USB). For example, multiple channels of the ADC 60 in the controller 20 receive analog signals from the various sensors 25 that are installed on the brake system and the wheels of the vehicle. The ADC converts the analog data to digital data and sends it to the processor 65.

Driver identification data from the driver recognition system 51 is communicated to the processor 65 along with the driver preference data inputted via the user interface 30. In one embodiment, the driver recognition system 51 is connected to the vehicle security system 28 in order to disable the vehicle when an unrecognized or unauthorized driver tries to operate the vehicle 10. Further, the driver recognition system 51 can be connected to other safety systems 29 in the vehicle 10 in order to share driver specific information. In order to increase the identification capabilities and the security of the system 5, the driver recognition system 51 can include facial recognition, voice recognition, fingerprint recognition, and other types of biometrics recognition.

The processor 65 receives input data (such as sensor readings, driver preference data, and driver identification data) and processes the information by executing one or more applications or modules described above in order determine a driver dependent braking force and to control the brake system 40 of the vehicle 10. The applications or modules (or other instructions that are executed by the controller 20) are stored in memory, such as ROM 70. The processor 65 stores predetermined brake control data (e.g., specific boost ratio, estimated driver dependent brake force, brake pedal feel, brake pedal position, etc.) to the ROM 70 or stores information generated by the applications or modules executed by the processor 65 to the RAM 69. Further, the RAM 69 can receive and store data from all other components of the system 5. The information stored in the RAM 69 and in the external memory 74 is read and used by the processor 65 when executing the various modules and applications. While RAM 69 is used in the embodiment shown in FIG. 4, other memory devices can be also implemented.

The brake control data stored in the ROM 70 is organized in a plurality of lookup tables 58 (not shown) that can be selected from the processor 65 after executing the various applications and modules. These lookup tables 58 included in the ROM 70 are associated with a specific driver or a class of drivers identified by the driving pattern classification module 53. The brake control data for each driver or driving pattern class that includes lookup tables 58 provides the system 5 with information about the braking preferences of the driver or class of drivers. The brake control data includes specific boost ratio or amplification degree for the brake booster, estimated driver dependent brake pedal force, brake pedal position, specific brake booster chamber pressure, engine vacuum (or manifold absolute pressure), master cylinder pressure, temperature, and other characteristics used by the system 5 to control the brake system 40.

The SPI master controller 68 helps the processor 65 to communicate with the external memory 74 and a system driver 62 of the ECU 15. The system driver 62 can include various drivers (e.g., steering driver, pedal adjust driver, booster driver, motor driver, etc.) that are used by the ECU to control the brake system 40. The external memory 74 includes its own serial peripheral interface (not shown) and communicates with the processor 65 through the SPI master controller 68. The external memory 74 is electrically rewritable and stores a plurality of data frames 59 that are created based on the driver's behavior and classification history (determined from the input data from the sensors 25), the driver identification data inputted by the driver, the driver priority and history data determined by the system 5, and the driver preference data.

Figure 5:
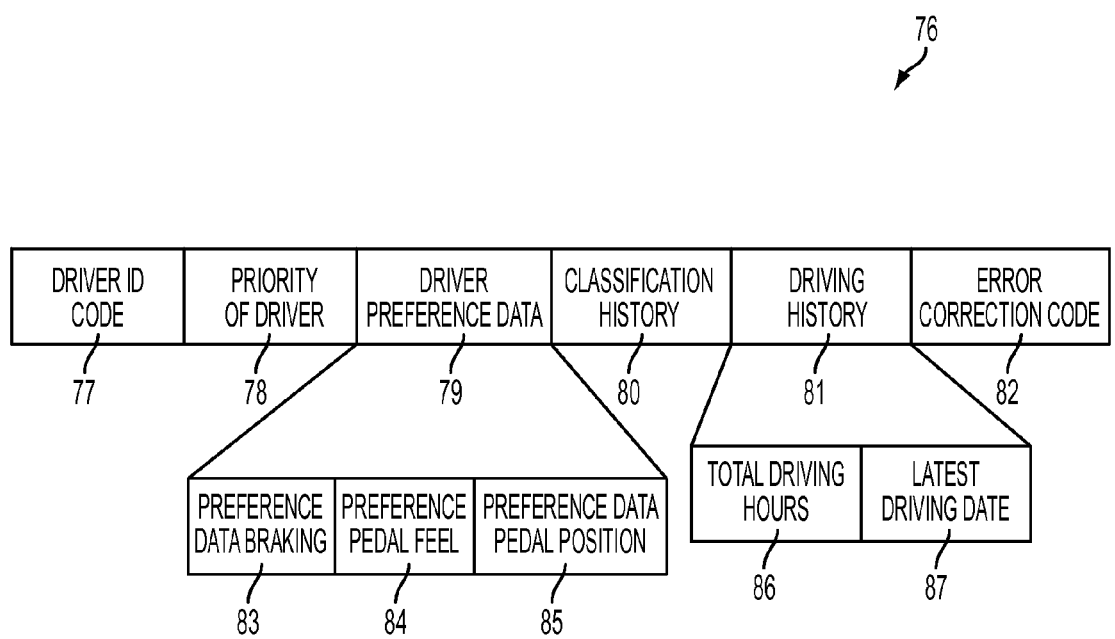
FIG. 5 illustrates a data frame storing data used by the system for controlling the brake force of a vehicle in accordance with the invention.

FIG. 5 illustrates an example of a data frame 76 that includes various driver identification and preference data and is stored in the external memory 74 of the controller 20. The data frame 76 comprises various sub preference data records including a driver ID code 77, driver priority data 78, driver preference data 79, classification history 80 for a specific driver, driving history 81, and error correction code 82. The driver ID code 77 is recorded as a specific identifier for every driver and ID assigned by the driver recognition system 51. The error correction code 82 multiplies address bits so when partially incorrect data is read from or written to the data frame this data can be partially corrected by the code 82. The driver preference data 79 further includes brake force preference data 83, pedal feel preference data 84, and pedal position preference data 85. The driving history 81 includes the total hours of driving 86 and the latest driving date 87 associated with a particular driver or driver ID code 77.

Each data frame 76 and each sub preference data record occupies predetermined memory location of the external memory 74. The driver recognition module 54 in the controller 20 receives updated driver identification (i.e., driver ID code 77 or driver's name associated with the driver ID code 77) from driver recognition system 51. Based on the provided driver identification from the data frame in the external memory, the system 5 retrieves brake control data that includes a lookup table 58 from the data stored in the memory 50. When an existing driver is recognized based on information from the data frame, the system 5 enables the brake system control module 57 to control the brake system 40 based on the brake control data from the internal memory associated with this ID code. In addition, the driver ID code 77 may correspond not to individual brake control data but to a driving pattern class in the memory 50. That way the driver is classified by the driving pattern classification module 53 and a particular brake control data associated with this particular driving pattern class is used to control the brake system 40.

The system 5 creates a new ID code 77 when a new driver is recognized. When new ID code needs to be created and the external memory 74 is full, the controller 20 deletes an exiting data frame 76 that is currently stored in the external memory 74. The deleted data frame 76 is selected by the system 5 based on the driving history 81 associated with a particular driver ID code 77. The system 5 evaluates the latest driving date 87 and the total driving hours 86 for each saved driver ID code 77. The system 5 then applies a decision algorithm to optimize the selection of the least important driver ID based on the accumulated driving history data 81.

Figure 6:
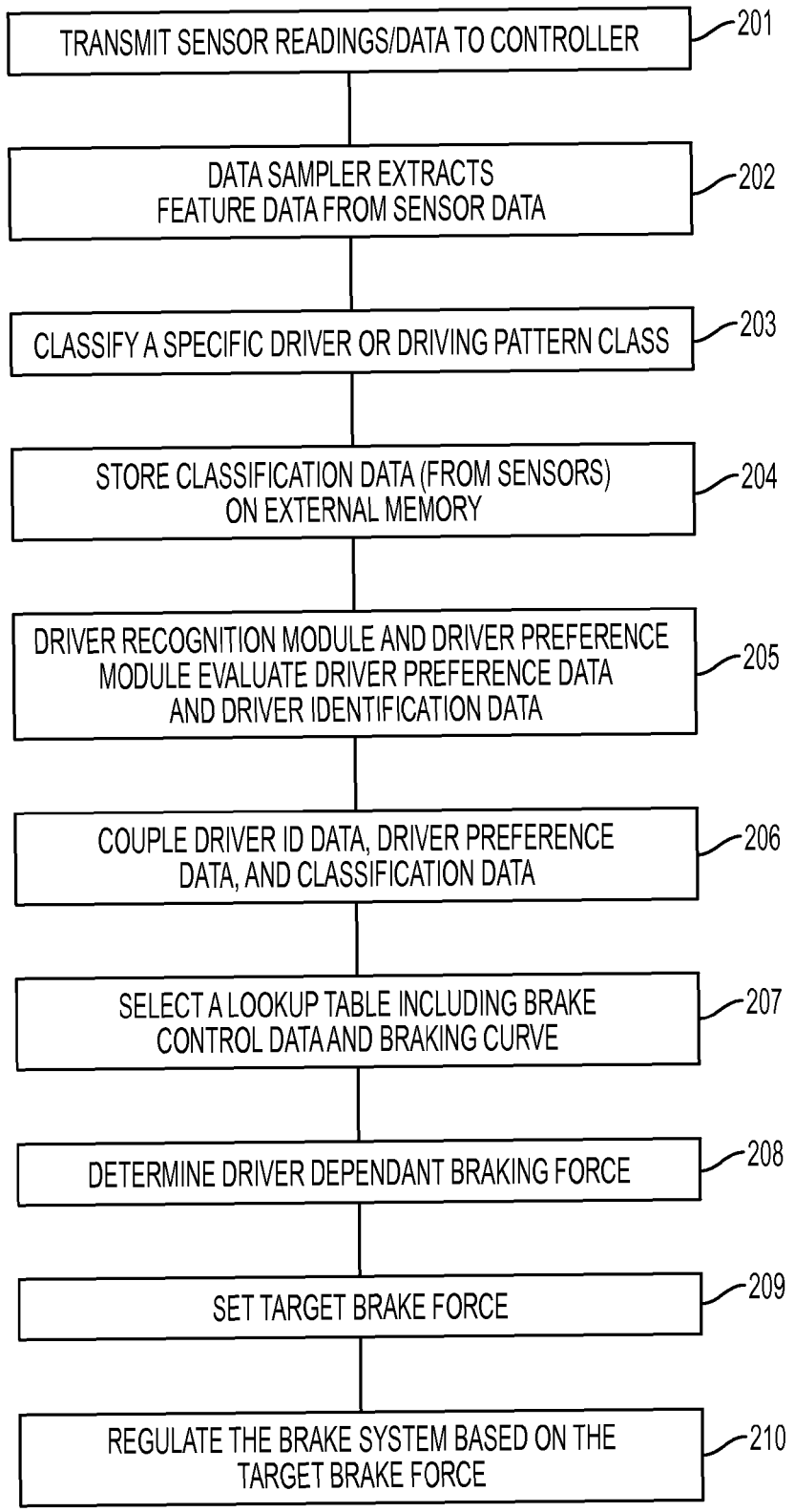
FIG. 6 is a block diagram that shows a control process performed by the system for controlling the brake force of a vehicle.

FIG. 6 illustrates a method or control algorithm 200 that shows the operation of the system 5 for controlling the brake system of a vehicle based on driver dependent braking force. In some embodiment, the method 200 is carried out by the controller 20 shown in FIG. 4. The various modules of the system 5 are configured to execute the control algorithm in order to determine driver dependent braking force based on the driver preference data, driver identification data, and driving pattern class determined based on various input sensor data.

Initially, various sensor data is gathered from multiple vehicle components via sensors 25 and is transmitted to the controller 20 (step 201). The raw data from each sensor 25 is varies over time (by its nature). A data sampler 71 extracts the desired feature data from the sensor data to be used by the driving pattern classification module 53 (step 202). Before the extraction of the feature data, the data sampler 71 adapts the sensor data to a physically possible range of values using internal filters that include slope limitation. Based on this data, the driving pattern classification module 53 classifies and selects a specific driver or a driving pattern class (step 203). After that, the classification data received from the sensors 25 is stored on the external memory 74 along with the correspondent driver identification data (step 204). Generally, the optimal classification data size of the external memory 74 is determined at the vehicle design stage.

The driver recognition module 54 evaluates the driver identification data from the driver recognition system 51 and the driver preference module 55 evaluates the driver preference data received via the user interface 30 (step 205). The driver preference module 55 processes brake force preference data 83, pedal feel preference data 84, and pedal position preference data 85. In the next step, the driver identification data is coupled with the driver classification data and the preference data (step 206). The system 5 selects a lookup table 58 from the plurality of lookup tables that are stored on the memory 50 of the controller 20 (step 207). As described above, the lookup table 58 includes brake control data, including braking curve, for a specific driver or driving pattern class and provides the system 5 with information about the braking preferences of the driver or class of drivers. The system 5 then uses the driver dependent brake force module 56 to determine driver dependent braking force from the brake control data stored in the selected lookup table based on the received sensor data (step 208). Using the brake system control module 57, the system 5 sets a target brake force 73 (step 209) based on the driver dependent braking force and regulates the brake system 40 in order to control the actual brake force of the vehicle 10 (step 210).

Figure 6A:
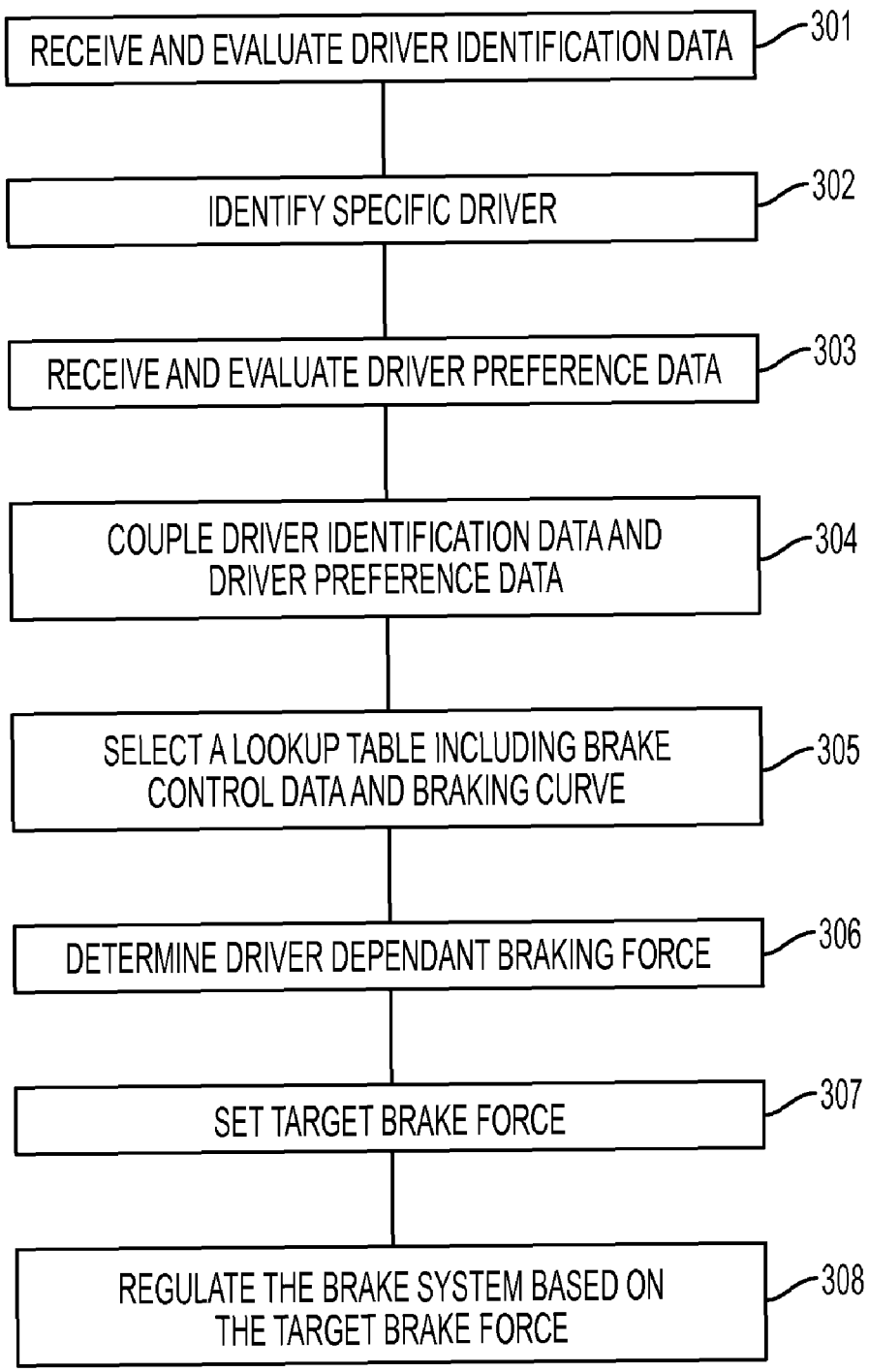
FIG. 6A is a block diagram that shows an alternative control process performed by the system for controlling the brake force of a vehicle.

FIG. 6A illustrates an alternative method or control algorithm 300 that shows the operation of the system 5 for controlling the brake system of a vehicle based on driver dependent braking force. In some embodiments, the method 300 is carried out by the controller 20 shown in FIG. 4. Initially, the driver recognition module 54 evaluates the driver identification data from the driver recognition system 51 (step 301) in order to identify the driver (step 302). Next, the driver preference module 55 evaluates the driver preference data received via the user interface 30 (step 303). The driver preference module 55 processes brake force preference data 83, pedal feel preference data 84, and pedal position preference data 85. In the next step, the driver identification data is coupled with the driver preference data (step 304). The system 5 then selects a lookup table 58 from the plurality of lookup tables that are stored on the memory 50 of the controller 20 based on coupled data (step 305). The lookup table includes brake control data and a braking curve. The system 5 then determines driver dependent braking force from the brake control data stored in the selected lookup table (step 306). Using the brake system control module 57, the system 5 sets a target brake force 73 (step 307) based on the driver dependent braking force and regulates the brake system 40 in order to control the actual brake force of the vehicle 10 (step 308).

As described above, one of the functions of the system 5 is to select a lookup table 58 that includes brake control data for a specific driver or driving pattern class from the memory 50 of the controller 20 (step 207 of method 200). To accomplish this, the controller 20 executes the driving pattern classification module 53 that selects a lookup table 58 that includes brake control data used to control the brake system 40. In that process, the driving pattern classification module 53 converts the selected feature data from the sensors 25 to a corresponding output class as a search index that is based on predetermined classification rules stored in the memory 50 of the controller 20.

This output class is a search index for the driving pattern classification module 53 to search the plurality of lookup tables 58 in the memory 50 and to determine the brake control data, including the target brake force 73 to regulate the active brake booster 42 of the brake system 40. The system 5 can use multiple search indexes separately or combined together for the selection of the lookup table 58. The system 5 periodically updates the latest classification data results on the external memory 74. In some embodiments, when the speed of calculating the target brake force 73 is not an issue, the lookup table 58 is replaced by a specific calculation formula in order to calculate more complicated outputs.

The predetermined classification rules used by the driving pattern classification module 53 are programmed to operate with statistical classification algorithms which are typically used in pattern recognition systems. These statistical classification algorithms use artificial intelligence (AI) technology that includes various training and boosting schemes. The driving pattern classification module 53 compiles statistics, and classifies a driver and a driver pattern class based on the continuously received sensor data and driver identification data. The driving pattern classification module 53 is a linear pattern classifier that makes classification decisions based on the value of a linear combination of the input data characteristics. The linear classifier includes a Fisher's linear discriminant, a Logistic regression classifier, a Naive Bayes classifier, a Perception classifier, or a Support vector machine. A linear classifier is desirable where the speed of classification is an issue, since it is often the fastest classifier. The driving pattern classification module 53 can also be a nonlinear pattern classifier. When implemented using a nonlinear classifier, Artificial Neural Networks, Support Vector Machines, k-Nearest Neighbors, Gaussian Mixture Models, Naive Bayes, Decision Tree and RBF classifiers may be used. The goal of the system 5 is to create an "intelligent active brake force booster" that is dependent on the driver's behavior and recognizes the driver operating the vehicle 10 based on the input sensor data and the identification information received from the driver. In addition, the system 5 allows the driver to select a specific level of boost power.

The driving pattern classification module 53 includes and executes a plurality of sub-classification modules 72. Each sub-classification module 72 classifies a different type of data received by the driving pattern classification module 53 (i.e., individual data sets from the recognition sensors 26). The data classified by each sub-classification module 72 corresponds to data in the memory 50. Each module 72 creates an independent sub-classification result, and the collection of these results is analyzed by the driving pattern classification module 53 to make the final classification selection.

The "intelligent brake booster" enables the system to control the brake system 40 based on the recognition of a specific driver and the predetermined brake force settings associated with this particular driver. In addition, the system 5 uses the driving pattern classification module 53 to group drivers that have similar driving behavior into driving pattern classes. By creating this driving pattern classes, the system 5 can select brake control data from the lookup tables 58 when drivers have similar driving behavior and use this brake control data to control the drive's brake system. For example, young drivers prefer dynamic operation of the braking system and more senior drivers prefer more sensitive braking response. This feature can be utilized in rental cars, where a different driver uses the vehicle every day and the system 5 can quickly determine the driving pattern class of every driver and control the brake force based on the stored driver dependent force associated with that class.

Instead of using the classification data from the sensors and executing the driving pattern classification module 53, the system 5 applies the driver preference data as the search index of the lookup tables 58. The system 5 allows the driver to "program" the parameters of the brake system by selecting his or her own preference data via the vehicle's user interface 30. The user interface can be integrated into the vehicle 10 (i.e., onboard computer or a navigation system) or can be external to the vehicle 10 (i.e., a PDA) with specific application software that is configured to electronically communicate with the controller 20.

Further, the driver identification data received from the driver recognition system 51 and processed by the driver recognition module 54 is coupled the driver preference data and the driving pattern classification history data. By using the vehicle user interface 30, a driver can select which data settings are to be used to by the system 5 to control the brake system 40. The driver can select between the entered driver preference data settings and the automated classification data settings that are stored in the memory 50.

Figure 7:
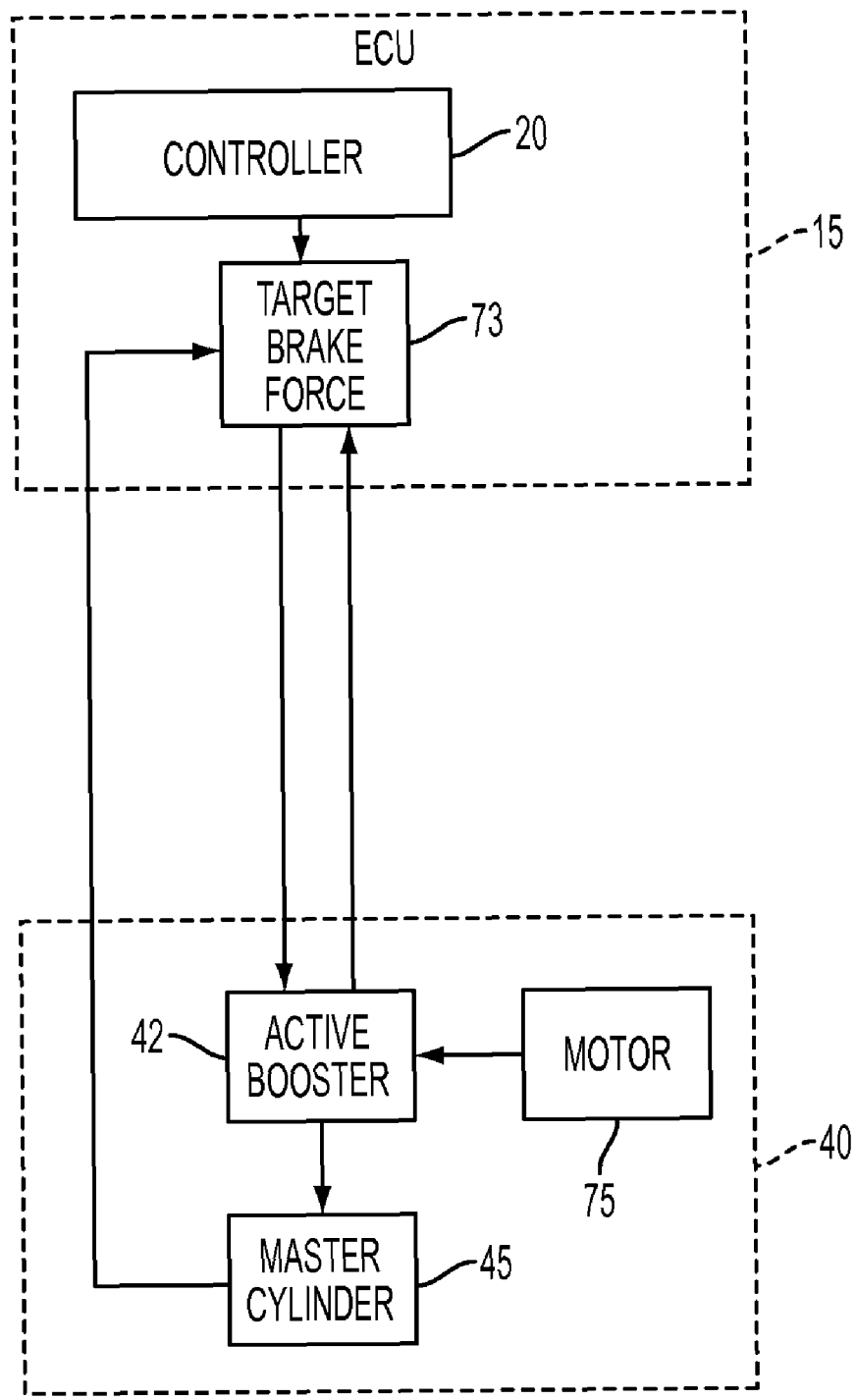
FIG. 7 is a block diagram that shows the operation of the brake system for controlling the brake force of a vehicle using a feedback closed loop.

FIG. 7 schematically illustrates the operation of the brake system 40 for controlling the brake force of the vehicle 10 based on driver dependent brake data and using a closed feedback loop (not all elements of the brake system are shown). As discussed above in relation to FIG. 2, the brake system 40 is operated by the ECU 15 and the ECU 15 is connected with other vehicle systems via the CAN communication bus 27 (not shown). In the brake system 40, the brake pedal 41 transmits the exact brake pedal position to the ECU 15. When the system 5 determines the appropriate target brake force 73, the controller 20 of the ECU 15 sends that target brake force 73 to active brake booster 42. Using the target brake force 73, the active brake booster 42 amplifies the input pedal force from the driver to output force to the master cylinder 45 using engine boosted vacuum or electronically controlled motor 75. When the system 5 is implemented in a brake-by-wire system, the master cylinder 45 is replaced by a direct brake force motor.

At any given moment, the active brake booster 42 transmits the level of the target brake force 73 (the force inputted into the brake booster 42) to the controller 20. In addition, the master cylinder 45 transmits the level of the actual brake force provided by the master cylinder from the booster to the controller 20. That way, a feedback loop is created where the controller 20 receives feedback from the brake booster 42 and the master cylinder 45 to control the desired target brake force 73. For example, if the master cylinder 45 returns actual brake force that is below the desired target brake force 73, the controller 20 regulates the brake booster 42 and increases the amplification level of the input pedal force (which is also known at that point) in order to reach the target brake force 73. As described in FIG. 2, the system 5 uses various sensors 25 to detect the brake force from the different components of the brake system 40.

Figure 8:
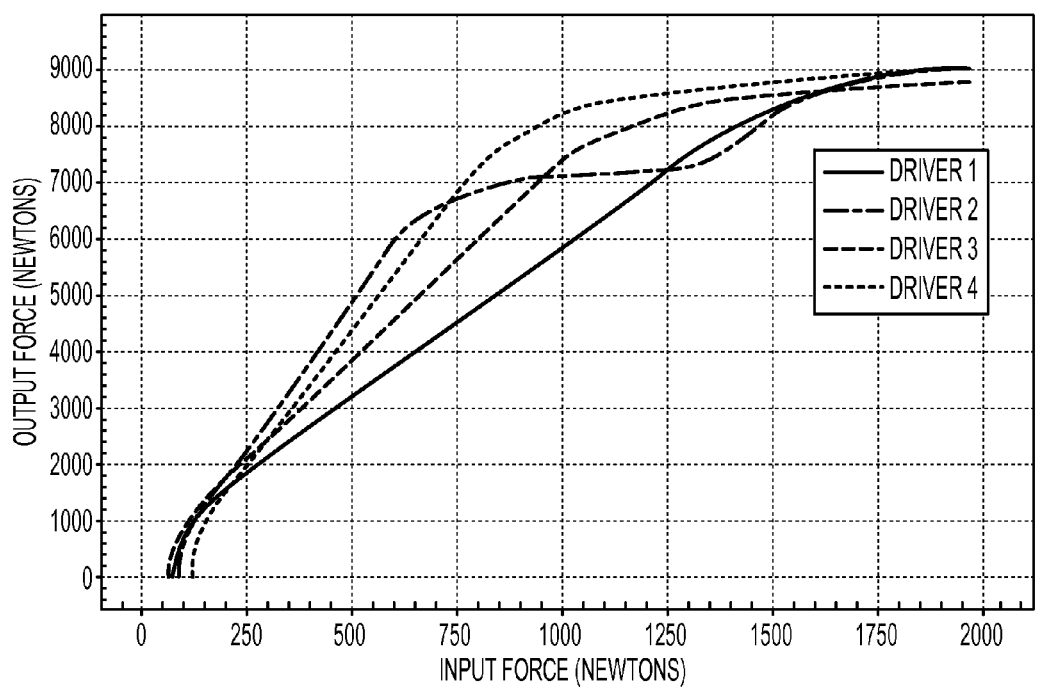
FIG. 8 illustrates a driver dependent lookup table selected by the system for controlling the brake force of a vehicle.

FIG. 8 illustrates brake force amplification curves based on driver dependent lookup tables 58 that regulate the force of the brake system 40 via the brake booster 42. The driver dependent amplification curves 1-4 indicate four different types of amplification based on different lookup tables controlling the brake booster 42. A driver (by manual selection) or the classification module 53 (by automatic selection) can select any of the shown curves that best correspond to the driver's preference or behavior. In contrast to conventional amplification curves that generally have only one slope change, the advanced brake force amplification with the intelligent electric booster can have multiple slope changes. In the graph, the x-coordinate represents the input brake force generated by operating the brake pedal and the y-coordinate represents the output force in the master cylinder.

As shown in FIG. 8, the first amplification curve represents more conservative driving behavior and begins from a certain position above a defined threshold, at which the applied brake force is larger than a predetermined minimum. The slope of the first curve is increased in relation with input force from the brake pedal. This means that the brake system generates a higher master cylinder pressure based on a larger scope of the first curve (extracted from the lookup table), which leads to a larger boosting effect of the active booster 42. The brake booster 42 amplifies the pedal force until the output force reaches a predetermined value.

The second curve illustrates a situation where the lookup table includes multiple slopes and the representing curve (i.e., the amplification) gets smaller as it approaches the predetermined maximum output force value. Amplification curves 3 and 4 represent additional examples of different levels of brake force amplification based on different lookup tables 58. Having multiple slope changes gives a progressive pedal feel in an emergency situation based on the behavior of the specific driver. In comparison with passive boosters, the active brake booster 42 provides a steeper amplification curve in the operating range of the vehicle's brake system.

Various features and advantages of the invention are set forth in the following claims.

What is claimed is:

1. A system for controlling a brake force of a vehicle, the system comprising:
   an electronic control unit including a controller;
   a plurality of sensors in electronic communication with the controller, each of the sensors transmitting sensor data to the controller;
   a user interface and a driver recognition system in electronic communication with the controller; and
   a computer readable memory storing instructions that, when executed by the controller, cause the controller to:
      evaluate driver identification data received from the driver recognition system and driver preference data received from a driver via the user interface, the driver preference data including brake pedal parameters,
      evaluate the sensor data received from the sensors,
      classify and select a driver or a driving pattern class,
      execute a control algorithm to determine a driver dependent brake force based on the selected driver or driving pattern class, the driver preference data, and the driver identification data, and
      regulate the brake force of the vehicle based on the driver dependent brake force.

2. The system of claim 1, wherein the computer readable memory further stores instructions from a driving pattern classification module that, when executed by the controller, evaluates the sensor data received from the sensors and classifies the driver or the driving pattern class based on the sensor data and the driver identification data.

3. The system of claim 2, wherein the driving pattern classification module classifies the driver or the driving pattern class based on predetermined classification rules that operate with statistical classification algorithms used in pattern recognition systems.

4. The system of claim 2, wherein the driving pattern classification module is a linear pattern classifier.

5. The system of claim 2, wherein the driving pattern classification module is a nonlinear pattern classifier.

6. The system of claim 2, wherein the driving pattern classification module includes a plurality of sub-classification modules that, when executed by the controller, create an independent sub-classification results and the driving pattern classification module analyzes these results to make a final classification selection.

7. The system of claim 1 further comprising a brake system including an intelligent active brake force booster that, when executed by the controller, regulates the brake force of the vehicle.

8. The system of claim 7, wherein the brake force booster includes an electromechanical brake force booster.

9. The system of claim 7, wherein the brake force booster includes a hydraulic brake force booster.

10. The system of claim 1, wherein the computer readable memory further stores instructions from a driver dependent brake force module that, when executed by the controller, determines the driver dependent brake force from a predetermined brake control data stored in a memory of the controller.

11. The system of claim 10, wherein the brake control data includes a driver dependent brake force, a specific boost ratio, a brake pedal feel, and a brake pedal position.

12. The system of claim 10, wherein the driver dependent brake force module determines the driver dependent brake force based on brake control data stored in the memory and selected based on the received sensor data.

13. The system of claim 1, wherein the computer readable memory further stores instructions from a driver preference module that, when executed by the controller, evaluates the brake pedal parameters of the driver preference data, the brake pedal parameters including a brake force preference data, a pedal feel preference data, and a pedal position preference data.

14. The system of claim 13, wherein the driver preference data accepts a predetermined format and is transferable between vehicles.

15. The system of claim 1, wherein the computer readable memory further stores instructions from a driver recognition module that, when executed by the controller, evaluates the driver identification data that includes a driver ID code, a driver priority, a latest driving date, and a total driving hours.

16. The system of claim 1, wherein the computer readable memory further stores instructions from a brake system control module that, when executed by the controller, regulates the brake force of the vehicle by setting a target brake force based on the driver dependent brake force.

17. The system of claim 1, wherein the user interface includes a driver selection switch.

18. The system of claim 1, wherein the user interface includes the driver recognition system.

19. The system of claim 1, wherein the driver recognition system includes a PDA, a key fob, or a biometric system.

* * * * *